(12) United States Patent
Nakagawa et al.

(10) Patent No.: US 10,317,854 B2
(45) Date of Patent: Jun. 11, 2019

(54) MACHINE LEARNING DEVICE THAT PERFORMS LEARNING USING SIMULATION RESULT, MACHINE SYSTEM, MANUFACTURING SYSTEM, AND MACHINE LEARNING METHOD

(71) Applicant: FANUC CORPORATION, Yamanashi (JP)

(72) Inventors: Hiroshi Nakagawa, Yamanashi (JP); Takafumi Kajiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 57 days.

(21) Appl. No.: 15/472,395

(22) Filed: Mar. 29, 2017

(65) Prior Publication Data

US 2017/0285584 A1 Oct. 5, 2017

(30) Foreign Application Priority Data

Apr. 4, 2016 (JP) ................. 2016-075476

(51) Int. Cl.
*G05B 13/02* (2006.01)
*B25J 9/16* (2006.01)

(52) U.S. Cl.
CPC .......... *G05B 13/027* (2013.01); *B25J 9/1664* (2013.01); *B25J 9/1671* (2013.01); *G05B 2219/39298* (2013.01); *G05B 2219/40515* (2013.01)

(58) Field of Classification Search
None
See application file for complete search history.

(56) References Cited

U.S. PATENT DOCUMENTS

2015/0356345 A1* 12/2015 Velozo ............... G06K 9/00228
382/103

FOREIGN PATENT DOCUMENTS

| JP | 9-319420 A | 12/1997 |
| JP | 2001-67125 A | 3/2001 |
| JP | 2002-331480 A | 11/2002 |
| JP | 2004-116351 A | 4/2004 |
| JP | 2011-173211 A | 9/2011 |
| JP | 5137537 B2 | 2/2013 |
| JP | 2013-52490 A | 3/2013 |
| JP | 2013-536095 A | 9/2013 |
| JP | 2014-79819 A | 5/2014 |
| JP | 2014-180705 A | 9/2014 |
| JP | 2015-85475 A | 5/2015 |

OTHER PUBLICATIONS

Liu et al., Neural Network based Adaptive Control and Optimisation in the Milling Process, 1999 Springer-Verlag London Limited.*

* cited by examiner

*Primary Examiner* — Carlos R Ortiz Rodriguez
(74) *Attorney, Agent, or Firm* — Hauptman Ham, LLP (57) ABSTRACT

A machine learning device that learns a control command for a machine by machine learning, including a machine learning unit that performs the machine learning to output the control command; a simulator that performs a simulation of a work operation of the machine based on the control command; and a first determination unit that determines the control command based on an execution result of the simulation by the simulator.

12 Claims, 6 Drawing Sheets

MACHINE LEARNING DEVICE THAT PERFORMS LEARNING USING SIMULATION RESULT, MACHINE SYSTEM, MANUFACTURING SYSTEM, AND MACHINE LEARNING METHOD

RELATED APPLICATIONS

The present application claims priority to Japanese Patent Application No. 2016-075476 filed Apr. 4, 2016, the disclosures of which is hereby incorporated by reference herein in its entirety.

BACKGROUND OF THE INVENTION

1. Field of the Invention

The present invention relates to a machine learning device that performs learning using a simulation result, a machine system, a manufacturing system, and a machine learning method.

2. Description of the Related Art

In recent years, for example, application of machine learning to a machine such as a robot has attracted attention, and research and development for practical use has been carried out. For example, in a system that learns a control command for a machine, it is necessary to ensure that the control command that controls the machine does not have any problem.

Meanwhile, there is conventionally disclosed an assembly robot that operates by estimating a position error via a neural network and correcting data of an operation program (for example, Japanese Laid-Open Patent Publication No. H09-319420: Patent Document 1).

Further, there is conventionally disclosed an apparatus that acquires a non-interfering optimum operation through learning by repeatedly inputting an operation command candidate with respect to a virtual system model (for example, Japanese Patent No. 5137537: Patent Document 2).

As described above, various proposals have been made in which machine learning is applied to a machine, but, for example, in Patent Document 1, depending on the obtained learning result, there is a possibility that the control command of the machine causes interference or the like with the machine or the surrounding environment. In other words, in machine learning, the safety of the learning result is not ensured, so that, for example, difficulty is experienced in preventing the interference or the like, which constitutes an obstacle when machine learning is introduced into a production line.

Further, for example, in Patent Document 2, since learning is performed using an evaluation result of system model, it is necessary that the system model is accurate, and optimization is enabled by providing a model reconfiguration unit to improve the accuracy of the system model. However, such approach is not realistic in that the accuracy of the optimization result depends on the accuracy of the system model so that a long time is needed to improve the system model.

In view of the aforementioned problems of the prior art, it is an object of the present invention to provide a machine learning device, a machine system, a manufacturing system, and a machine learning method, which can ensure the safety of machine learning.

SUMMARY OF INVENTION

According to a first aspect of the present invention, there is provided a machine learning device that learns a control command for a machine by machine learning, including a machine learning unit that performs the machine learning to output the control command; a simulator that performs a simulation of a work operation of the machine based on the control command; and a first determination unit that determines the control command based on an execution result of the simulation by the simulator.

The first determination unit may determine that the control command is good and performs inputting of the control command to the machine when there is no problem in the execution result of the simulation, and determine that the control command is bad and stops the inputting of the control command to the machine when there is a problem in the execution result of the simulation. When a determination result by the first determination unit is bad, the inputting of the control command to the machine may be stopped, and learning may be performed by providing a first result label obtained from the first determination unit to the machine learning unit as training data. When the determination result by the first determination unit is bad, the learning may be performed by providing, along with the first result label, a first state quantity including part or whole of calculation result data obtained from the simulator to the machine learning unit.

The machine learning device may further include a second determination unit that determines a work result of the machine by the control command, wherein when a determination result by the first determination unit is good, inputting of the control command to the machine may be performed, and learning may be performed by providing a second result label obtained from the second determination unit to the machine learning unit as training data. When the determination result by the first determination unit is good, the learning may be performed by providing to the machine learning unit, along with the second result label, a second state quantity including at least one of output data of a sensor that detects a state of the machine or a surrounding environment, internal data of a control software that controls the machine, and calculation data obtained based on the output data of the sensor or the internal data of the control software.

A state of the machine learning unit may be preserved as a first state regularly or when a pre-specified condition is satisfied; and the state of the machine learning unit may be returned to the first state when a frequency that the determination result by the first determination unit becomes good decreases. When the determination result by the first determination unit takes three or more states including good and bad, a command speed of the machine included in the control command may be changed based on the state. The machine learning unit may include a reward calculation unit that calculates a reward based on a work state of the machine; and a value function updating unit having a value function that determines a value for the control command and updating the value function based on the reward. The machine learning device may include a neural network.

According to a second aspect of the present invention, there is provided a machine system including the machine learning device according to the above first aspect and the machine, the machine system including a control apparatus that controls the machine; and a computer apparatus having the machine learning device including the machine learning unit, the simulator, and the first determination unit, wherein the computer apparatus and one or more the machines are connected via a network.

The learning of the machine learning unit may be performed continuously even during an actual production work by the machine, or performed in advance but not performed during the actual production work by the machine.

According to a third aspect of the present invention, there is provided a manufacturing system including a plurality of the machine systems according to the above second aspect, wherein the machine learning device is provided in each of the machine systems; and a plurality of the machine learning devices provided in the plurality of the machine systems are configured to mutually share or exchange data via a communication medium. The machine learning device may exist on a cloud server.

According to a fourth aspect of the present invention, there is provided a machine learning method that learns a control command for a machine by machine learning, the machine learning method including performing the machine learning to output the control command; executing a simulation of a work operation of the machine based on the control command; determining the control command based on a result of the execution of the simulation; determining that the control command is good and performing inputting of the control command to the machine when there is no problem in the execution result of the simulation; and determining that the control command is bad and stopping the inputting of the control command to the machine when there is a problem in the execution result of the simulation.

BRIEF DESCRIPTION OF THE DRAWINGS

The present invention will be more clearly understood by reference to the accompanying drawings, in which.

DETAILED DESCRIPTION

Before a detailed description of an embodiment of a machine learning device that performs learning using a simulation result, a machine system, a manufacturing system, and a machine learning method according to the present invention, an example of the machine system to which the present invention is applied and its problems will be described with reference to FIG. 1.

Figure 1:
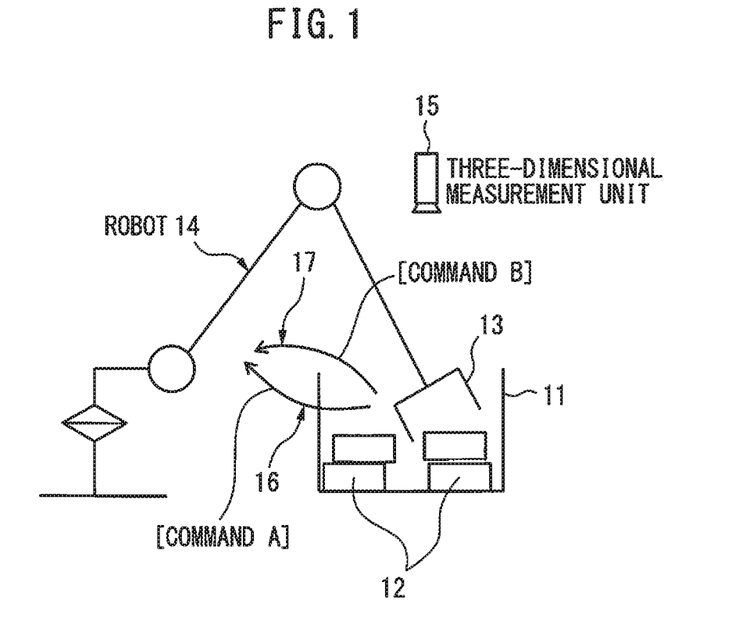
FIG. 1 is a diagram schematically illustrating an example of a machine system to which the present invention is applied.

FIG. 1 is a diagram schematically illustrating an example of the machine system to which the present invention is applied, wherein there is illustrated a manner in which a robot 14 having an end effector 13 attached thereto performs an operation for taking out a workpiece 12 from a cage 11. As illustrated in FIG. 1, in one example of the machine system, a three-dimensional measurement device 15 is provided above the cage 11, and a depth image of the workpiece 12 is photographed by the three-dimensional measurement device 15. Further, based on the depth image (image 30) photographed by the three-dimensional measurement device 15, the robot 14 learns the operation of taking out the workpiece 12. The robot 14 is, for example, a 6-axis articulated robot, and a drive shaft for each of the robot 14 and the end effector 13 is controlled by a control command (command) from a control apparatus (machine learning device).

Meanwhile, when learning a command to the robot 14 via machine learning, interference may occur depending on the command acquired by a machine learning device (20). For example, when the command to the robot 14 is inappropriate (bad), specifically, when the end effector 13 is caused to move (operate), as indicated by a locus 16, based on a command A in FIG. 1, the end effector 13 (robot 14) and the cage 11 tend to interfere with each other.

In other words, it is required that the command to the robot 14 be appropriate (good), specifically, it is required that the robot 14 perform work such that the end effector 13 and the cage 11 do not interfere with each other as indicated by a locus 17 of the end effector 13 based on a command B in FIG. 1; however, for example, when the above command A is inputted to the robot 14, interference may occur, thus damaging the cage 11, the end effector 13, the robot 14 and the end effector 13 or a peripheral device. Particularly, in an actual production line, this leads to a production stop so that a big problem arises. Further, depending on the state of the workpieces 12 in the cage 11, it may occur that the robot 14 is unable to successfully extract a workpiece 12 due to interaction with the other workpieces 12. In this case as well, a problem arises in which the takt time of the work is delayed.

Hereinafter, with reference to the accompanying drawings, a detailed description will be made of embodiments of a machine learning device, a machine system, a manufacturing system, and a machine learning method, which perform learning using a simulation result according to the present invention. Although, in the present specification, an industrial robot controlled by a control apparatus will be described as a machine by way of example, it goes without saying that the present invention may be applied, for example, to a machine tool, a forging press machine, an injection molding machine, a service robot, or the like, which are controlled by a control apparatus.

Figure 2:
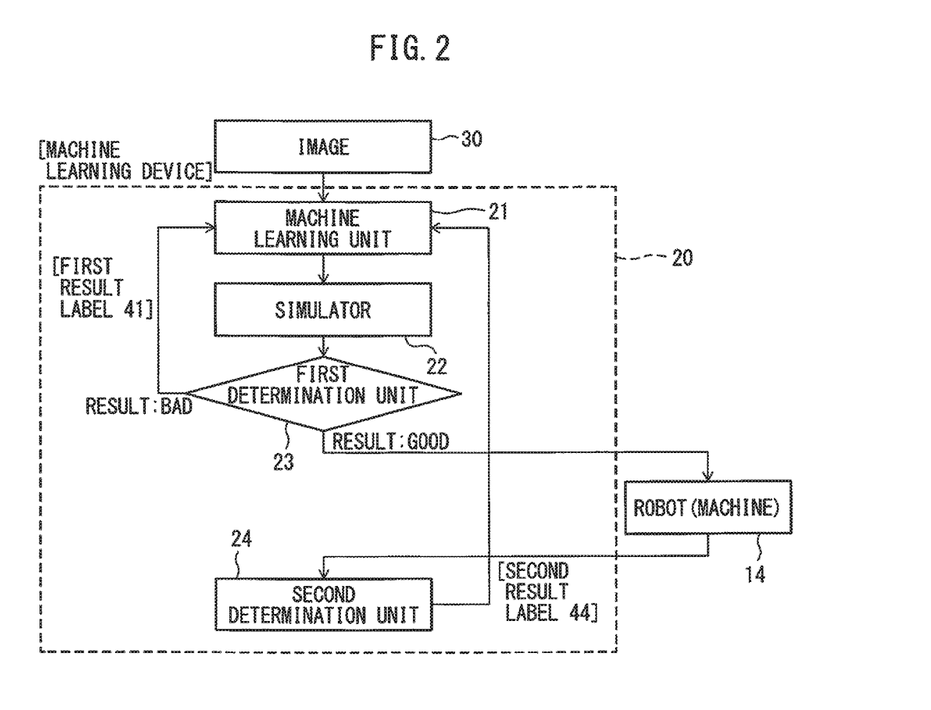
FIG. 2 is a block diagram illustrating a first embodiment of the machine learning device according to the present invention.

FIG. 2 is a block diagram illustrating a first example of the machine learning device according to the present invention, which may be applied, for example, to the machine system (robot system) described with reference to FIG. 1. The machine learning device 20 performs machine learning in response to receiving image information (image) 30 from the three-dimensional measurement device 15, and outputs a control command (command) to the robot (machine) 14, thereby controlling the work operation (work).

As illustrated in FIG. 2, the machine learning device 20 includes: a machine learning unit 21 that performs machine learning and outputs a control command; a simulator 22 that executes simulation of the work of the robot 14 based on the control command; a first determination unit 23 that determines the control command based on an execution result of the simulation by the simulator 22; and a second determination unit 24 that determines a work result of the robot 14 by the control command.

When there is no problem with the execution result of the simulation by the simulator 22, the first determination unit 23 determines that the control command output from the machine learning unit 21 is good and inputs it to the robot 14. Then, the robot 14 performs the work based on the control command for which the determination result by the first determination unit 23 is good. Meanwhile, when there is a problem with the execution result of the simulation by the simulator 22, the first determination unit 23 determines that the control command is bad and stops the input of the control command to the robot 14. More specifically, the control command for which the determination result by the first determination unit 23 is bad is not inputted to the robot 14, so that the robot 14 is made to avoid from performing the work based on the control command determined to have a problem with the execution result of the simulation by the simulator 22.

When the result of the determination by the first determination unit 23 is bad, not only the input of the control command to the robot 14 is stopped, but also, for example, a first result label 41 obtained by the first determination unit 23 is provided as training data to the machine learning unit 21 so that further learning can be performed.

As such, according to the machine learning device 20 of the first embodiment, before the robot 14 is actually operated, the control command is executed by the simulator 22, so that, for example, the distance between the peripheral device and the robot 14 and the movement of the workpiece 12 are simulated beforehand, and the possibility of occurrence of interference or failure to take out the workpiece 12 is determined by the first determination unit 23. Further, based on the execution result of the simulation by the simulator 22, the actual machine (the robot 14) is operated only when it is evaluated (determined) that there is no problem, thus making it possible to prevent the damage of the actual machine, failure of the work, or the like. More specifically, according to the first embodiment, it is possible to ensure the safety of machine learning, i.e., to prevent occurrence of problems such as damage to the machine, failure of the work or damage to the peripheral device.

Further, in the machine learning device 20 of the first embodiment, the second determination unit 24 determines the work result of the robot 14 by the control command. When the determination result by the first determination unit 23 is good, inputting of the control command to the robot 14 is carried out, and a second result label 44 obtained by the second determination unit 24 is provided as training data to the machine learning unit 21 to perform learning.

More specifically, the control command is evaluated by the simulator 22, the evaluation result by the simulator is determined by the first determination unit 23, and when the determination result is good, inputting of the control command to the robot 14 is carried out to cause the robot 14 to perform an actual operation. Then, the operation result (work result) of the robot 14 is evaluated (determined) by the second determination unit 24, and the second determination unit 24 outputs the second result label 44. The machine learning unit 21 performs learning of the control command (machine learning) based on the second result label 44, the first result label 41 from the first determination unit 23, and the training data from the image 30.

Meanwhile, when the determination result by the first determination unit 23 is bad, inputting of the control command to the robot 14 is not carried out, and the first result label 41 is outputted from the first determination unit 23 to the machine learning unit 21. Then, the machine learning unit 21 performs learning of the control command based on the first result label 41 and the training data from the image 30.

Figure 3:
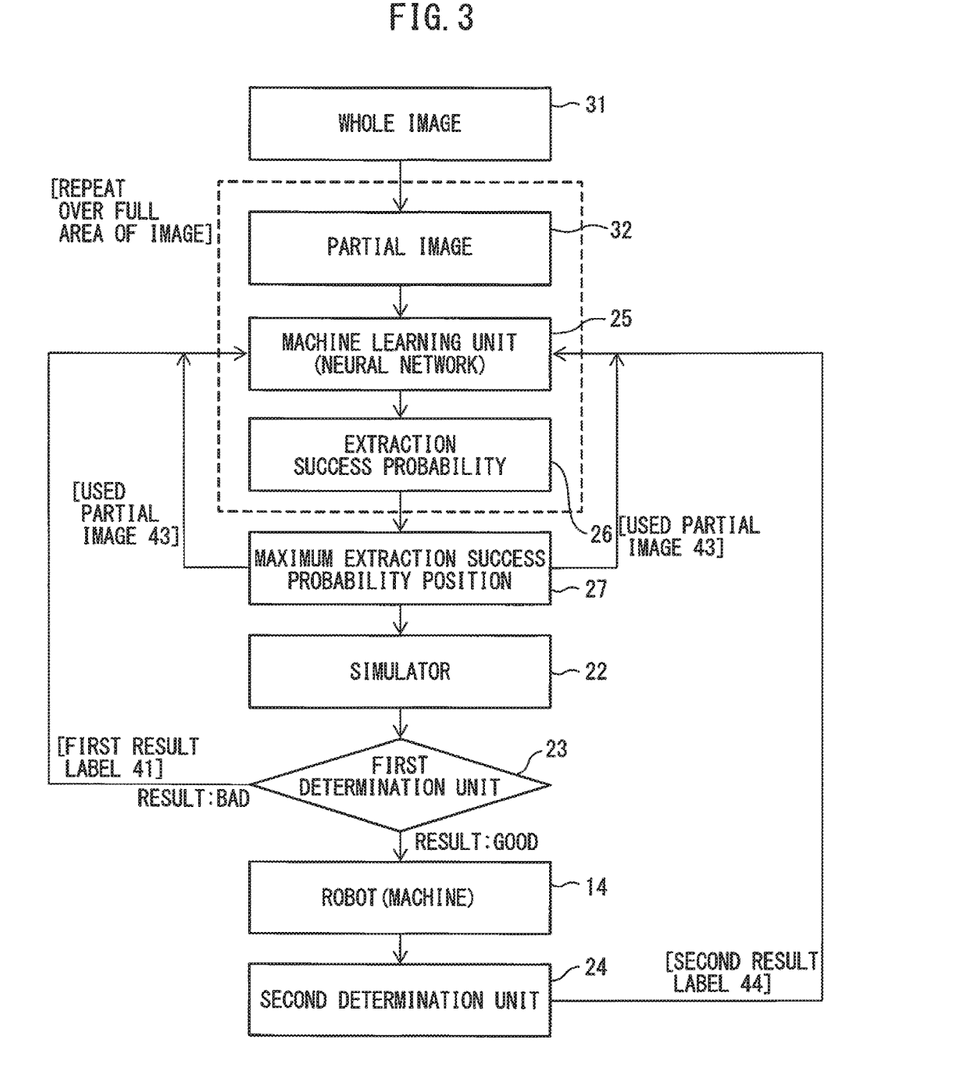
FIG. 3 is a diagram for explaining an example of processing in the machine learning device illustrated in FIG. 2.
Figure 4:
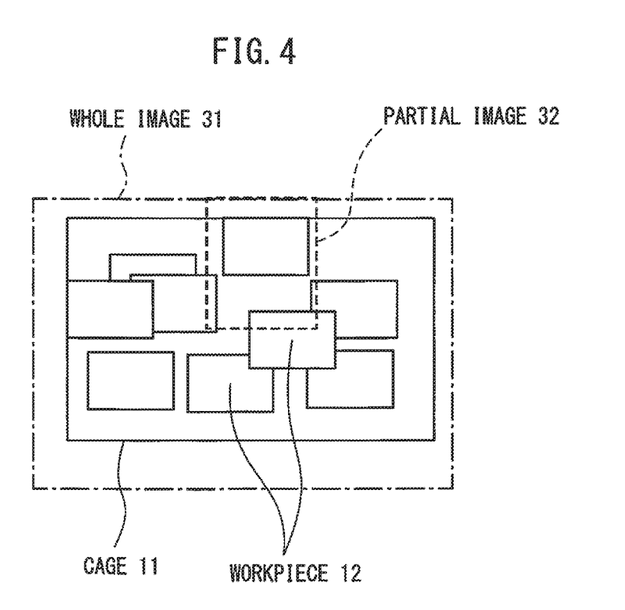
FIG. 4 is a diagram for explaining an example of a process for cutting out a partial image from the whole image illustrated in FIG. 3.

FIG. 3 is a diagram for explaining an example of processing in the machine learning device illustrated in FIG. 2, and FIG. 4 is a diagram for explaining an example of processing for cutting out a partial image from the whole image illustrated in FIG. 3. Subsequently, referring to FIGS. 3 and 4, description will be made of an example of a process of forming a partial image 32 by cutting out a part of the image from the whole image 31 acquired by the three-dimensional measurement unit 15 illustrated in FIG. 1.

As illustrated in FIG. 4, the partial image 32 can be formed by cutting out an arbitrary portion from the whole image 31, and, normally, the cutting-out process is repeatedly performed until the entire area is covered while being offset at regular intervals. Specifically, for example, when the partial image (32) having horizontally 80 pixels and vertically 80 pixels is formed while being offset for each 40 pixels both vertically and horizontally with respect to the whole image 31 having horizontally 320 pixels and vertically 240 pixels, there are obtained such partial images, as many as $\{(320-80)/40+1\} \times \{(240-80)/40+1\}=7 \times 5=35$.

The thus formed partial image 32 is inputted to the machine learning unit 25, which uses the neural network, and an extraction success probability 26 is obtained as an output of the machine learning unit 25. This is repeatedly carried out for all the partial images, and a partial image (32) having the highest extraction success probability is selected to acquire position information (information on the highest extraction success probability position) 27 from which the partial image 32 is cut out.

The neural network (25) is composed of an arithmetic unit imitating a model of neuron, a memory, and the like, and may use a general-purpose computer and a processor; however, higher speed processing is enabled by applying, for example, GPGPU (General-Purpose computing on Graphics Processing Units), a large-scale PC cluster or the like thereto.

The position information of the highest extraction success probability position 27 is inputted to the simulator 22 to perform the operation of the robot 14 (simulation of the work operation). For example, by setting beforehand an operation, such as transporting the workpiece 12 from the workpiece 12 take-out position to a carry-out position through a position immediately above the cage 11, on the simulator 22, it is possible to generate a locus of the take-out operation.

A simplified form of the simulator 22 may, for example, be one which generates a take-out operation from the take-out position and outputs time-series data of a robot tip position (end effector 13). The time-series data is inputted to the first determination unit 23, and by checking whether or not the robot tip position departs from the range pre-specified by the user, it is possible to check presence/absence of interference, and thus it is possible to determine whether the operation result is good or bad, i.e., whether the control command is good or bad.

Further, a more sophisticated type of the simulator 22 may be configured as a simulator that carries out a so-called physical simulation, for which, for example, the influence of the gravity, the interference between the workpieces, the load on the motor used with the robot, and the like are calculation objects, by modeling including physical values such as shape model, weight, and the like of the robot 14, the hand (end effector 13), the cage 11, the workpiece 12, the surrounding environment, and the like.

In this case, it becomes possible to make simulation (evaluation) not only with respect to checking the range of the robot tip position but also with respect to take-out failure due to mutual interference between the workpieces or error stop of the robot due to overload. Further, it becomes possible to make a still higher-level determination by selecting and combining necessary ones from the criteria for determination of being good or bad by the first determination unit 23 since the evaluation result obtained from the simulator 22 covers wide-ranging items such as the amount of damage to the robot 14 or the workpiece 12 due to the interference, the margin of the interference, and so forth.

As described above, when determination of being bad is made by the first determination unit 23, the control command is not inputted to the actual robot 14 (actual machine), but the first result label 41 from the first determination unit 23 and the training data from the partial image 43 as used are inputted to the machine learning unit (neural network) 25 to perform learning of the control command. In this manner, for example, it is possible to avoid inputting a bad (problematic) control command to the actual machine as well as to cause the machine learning unit 25 to perform learning not so as to output the bad control command.

Figure 5:
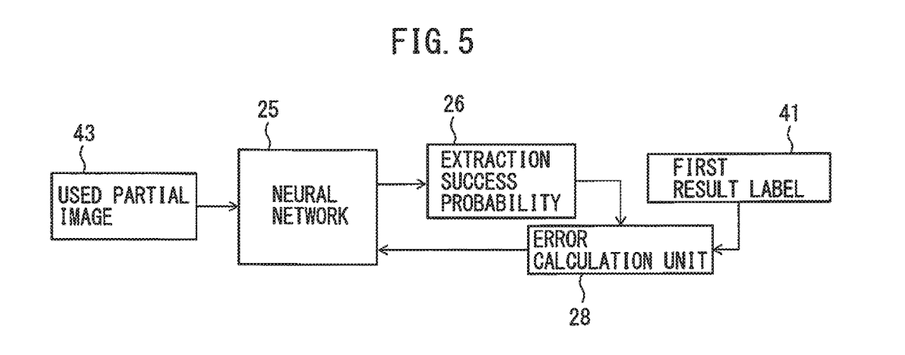
FIG. 5 is a diagram for explaining a configuration example of input and output of the neural network applied to the machine learning device illustrated in FIG. 2.

FIG. 5 is a diagram for explaining a configuration example of input and output of the neural network applied to the machine learning device illustrated in FIG. 2. As illustrated in FIG. 5, the neural network 25 receives the partial image 32 as an input and outputs the extraction success probability 26. When learning is performed, for example, the set of the used partial image 43 and the first result label 41 is used as the training data, and the control command is learnt by supervised learning.

In other words, an error between the extraction success probability 26 obtained from the used partial image 43 and the first result label 41 obtained from the simulator 22 is calculated by an error calculation unit 28, and the error is back-propagated so that learning by the neural network 25 can be performed. Specifically, when it is arranged such that the extraction success probability 26 takes on a numerical value in a range from "0" representing failure to "1" representing success, the first result label 41 takes on the value of "0" or "1" depending on the result of extraction success/failure, so that the error can be calculated by taking difference between the two.

When a determination of being good (right) is made by the first determination unit 23, it means that it is assured that the robot 14 (actual machine) operates (works) without problems, regardless of a control signal being inputted thereto. As a result, a control command is inputted to cause the actual machine (robot 14) to operate actually. Then, the result is observed by a sensor such as a camera, and the second determination unit 24 determines whether or not actually the result became good.

The result being good or bad (right/wrong) is outputted as the second result label 44 from the second determination unit 24 to the neural network 25. In other words, the neural network 25 receives the training data composed of the second result label 44 and the used partial image 43 and performs learning. This learning method is similar to the above-described learning for the case where use is made of the first result label 41 obtained from the simulator 22.

Although the first determination unit 23 and the second determination unit 24 perform the good/bad determination, the result output from each determination unit does not necessarily need to be binary ("0" or "1"). For example, a determination may be made in which, with thresholds being provided in two steps, a classification is made into three, i.e., "good", "passing", and "failing". This is because, for example, when the robot 14 passes near an obstacle such as the cage 11, depending on accuracy of the simulator 22, a situation occurs in which there is a suspected possibility of interference.

For example, when there is a suspected possibility of interference, it is possible to more minutely control the control command by configuring such that the determination by the first determination unit 23 is a determination in a ternary form including additionally "passing (intermediate)" or in a more multiple value form instead of in a binary form of "good (right)" and "bad (wrong)". In other words, when the determination result by the first determination unit 23 takes three or more states (multiple values) including good and bad, a control can be performed, based on the state, such that the robot 14 is operated by changing the command speed of the robot 14 included in the control command, specifically, by decreasing the command speed when there is a high possibility of interference.

In this manner, for example, even when interference by the robot 14 is caused, it is possible to minimize a damage to the robot 14 or a peripheral device. In addition, it is possible to more finely cope with the risk of interference by increasing the number of the stages of threshold up to 3, 4, and so on and changing the command speed for each stage.

The machine learning device 20 described with reference to FIG. 2 can be provided in the control device of the robot 14, but it turns out that the equipment is excessive in terms of cost when it is considered, for example, that the robot 14 is also used for work for which machine leaning is not performed. As such, the computer apparatus (machine learning device 20) that performs machine learning may be provided separately from the control device of the robot 14. With such hardware configuration, it is only required to provide an interface for receiving a control command at the control device side of the robot 14, and thus the cost of the control device of the robot 14 can be reduced. In addition, advantageously, it is also possible to easily improve the performance of the machine learning unit 21 or the simulator 22 by replacing only the computer apparatus in which the machine learning device 20 is provided.

Further, since the computer apparatus in which the machine learning device 20 is provided and the control device of the robot 14 are connected via a network, it becomes possible to connect the computer apparatus with a plurality of the robots 14 (control devices), and it is also possible to perform learning in many (all) of the robots 14 with the single computer apparatus by appropriately switching and connecting those of the robots 14 that perform learning. In other words, a robot system (machine system) including the machine learning device 20 and the robot 14 includes: the control device that controls the robot 14; and the computer apparatus having the machine learning device 20 including the machine learning unit 21, the simulator 22, and the first determination unit 23, wherein the computer apparatus and one or more robots 14 can be connected via a network.

In a machine system that actually carries out production, there is a case in which it is desired to improve the operation by learning while continuing the production. In particular, since machine learning requires many training data for learning, it is preferable to perform learning while using data used actually for production in order to enhance learning effect by increasing the number of performing learning (the number of data).

In this case, the problem is that sometimes it may not be ensured that the operation is always improved by learning, and on the contrary, the success rate of the operation may decrease. This problem, along with the problem of interference, may also become an obstacle to applying the learning function to the actual production line. Hence, when the success rate of the operation decreases, it may be configured such that learning is not performed when applied to a machine system that performs actual production. In other words, it may be configured such that the learning by the machine learning unit 21 is continuously performed, for example, even during the actual production operation by the robot 14 or alternatively it is performed in advance and not during the actual production operation by the robot 14.

Further, the state of the machine learning unit 21 is preserved with a timing specified beforehand such as at the actual production line input stage or regularly, and when the probability that the determination result by the first determination unit 23 becomes bad is increased, the machine learning unit 21 is returned to the previous state so that the performance of the machine learning unit 21 is restored, thus making it possible to further improve the efficiency by learning. In other words, it may also be configured such that the state of the machine learning unit 21 is preserved as a first state regularly or when a condition specified beforehand holds, and when the frequency that the determination result by the first determination unit 23 becomes good is decreased, the state of the machine learning unit 21 is returned to the first state. While, in the above-described first embodiment, an example in which "supervised learning" is applied is illustrated, but other learning methods such as "reinforcement learning" can also be applied.

Figure 6:
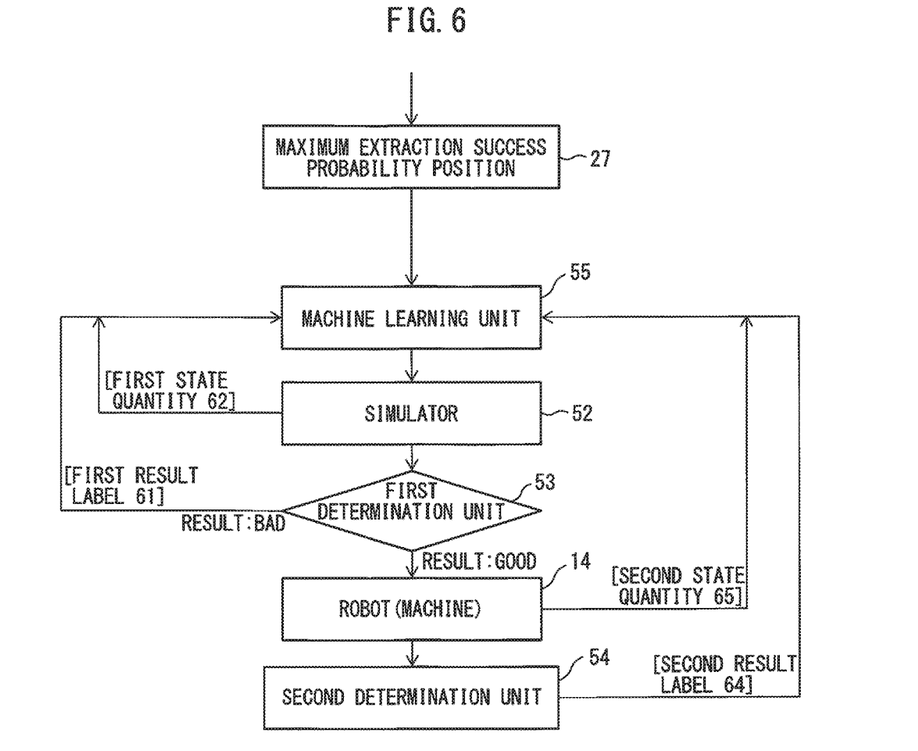
FIG. 6 is a block diagram illustrating a second embodiment of the machine learning device according to the present invention.

FIG. 6 is a block diagram illustrating a second embodiment of the machine learning device according to the present invention, wherein there is illustrated an example of the machine learning device to which enforcement learning is applied. Meanwhile, FIG. 6 illustrates an example in which a locus of take-out operation of the robot 14 is learnt under the assumption that a take-out position has already been determined. In the second embodiment illustrated in FIG. 6, the operation locus of the robot 14 is generated by a machine learning unit 55 and inputted to a simulator 52. In the simulator 52, the operation of the robot 14 is evaluated, and it is determined by the first determination unit 53 whether the operation is good or bad (right/wrong).

When the determination result by the first determination unit 53 is good, an input of a control command is carried out to the robot 14, and the robot 14 operates. The operation result of the robot 14 is determined by the second determination unit 54, and the determination result is sent as a second result label 64 to the machine learning unit 55, while at the same time, a second state quantity 65 including at least one of data representing the state of the robot 14 or the surrounding environment, internal data of a control software that controls the robot 14, and calculation data obtained based on one or both of the two data is sent to the machine learning unit 55. In other words, when the determination result by the first determination unit 53 is good, learning is performed by providing, along with the second result label 64, the second state quantity 65 including at least one of output date of a sensor that detects the state of the robot 14 or the surrounding environment, the internal data of the control software that controls the robot 14, and calculation data obtained based on the output data of the sensor or the internal data of the control software to the machine learning unit 55.

When the determination result by the first determination unit 53 is bad, the control command is not inputted to the robot 14, and the first result label 61 resulting from the determination by the first determination unit 53 and a first state quantity 62 composed of internal data of the simulator 52 are sent to the machine learning unit 55. In other words, when the determination result by the first determination unit 53 is bad, learning is performed by providing, along with the first result label 61, the first state quantity 62 including part or whole of calculation result data obtained from the simulator 52 to the machine learning unit 55.

Then, the operation locus generated by the machine learning unit 55 is generated, for example, by short steps of a certain time or a certain distance, simulation and determination are performed each time, and by repeating it, the entire operation locus is finally generated.

The machine learning unit 55, which receives the first result label 61 and the first state quantity 62 or the second result label 64 and the second state quantity 65, performs, for example, "reinforcement learning". Specifically, description is made of a case in which learning is performed through application of "Q-learning".

Q-learning is a method for learning a value Q(s, a) for selecting an action a under a certain environmental state s. In other words, under a certain state s, an action a with the highest value Q(s, a) may be selected as optimum action. However, at the beginning, for the combination of state s and action a, the correct value of the value Q (s, a) is not known at all. Therefore, the agent (action entity) selects various actions a under a certain state s, and a reward is given to the action a at that time. In this manner, the agent proceeds to learn selection of a better action, i.e., a correct value Q(s, a).

In the machine learning device of the second embodiment, when learning is performed through application of Q-learning, the state quantity s is composed of the first result label 61 outputted from the first determination unit 53 and the first state quantity 62 outputted from the simulator 52 or the second result label 64 outputted from the second determination unit 54 and the second state quantity 65 outputted from the robot 14, the peripheral device or the like.

The first result label 61 and the second result label 64 include, for example, the presence/absence of interference, the takt time, the distance to the final position, the success/failure of the grasping of the workpiece 12, and the like. The action a is a control command for the robot 14, and may be, for example, a moving direction and a moving speed of the tip position (end effector 13) of the robot 14.

Figure 7:
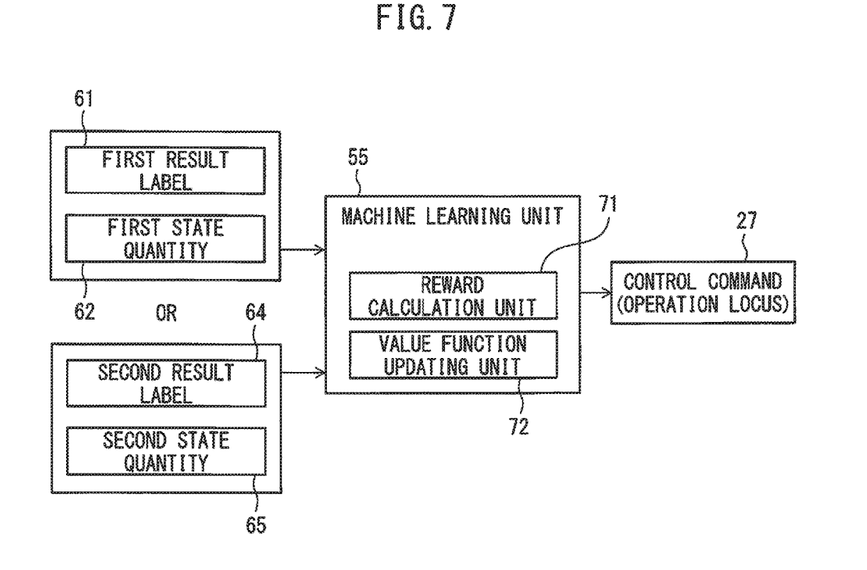
FIG. 7 is a diagram for explaining an example of a machine learning unit in the machine learning device of one embodiment.

FIG. 7 is a diagram for explaining an example of a machine learning unit in the machine learning device of one embodiment, wherein there is illustrated an example of a case in which "reinforcement learning (Q-learning)" is applied. As illustrated in FIG. 7, the machine learning unit 55 includes a reward calculation unit 71 and a value function updating unit 72. The reward calculation unit 71 calculates a reward, e.g., a score, for example, based on the first result label 61 and the first state quantity 62 or the second result label 64 and the second state quantity 65.

The reward is set, for example, to be higher with respect to success of the operation and lower with respect to failure of the operation. The reward may also be calculated, for example, based on the takt time of the operation. Further, regarding reward, for example, the reward may be calculated according to each step such as success of gripping by the hand part (end effector 13) or success of transportation by the hand part. Further, for example, when it is determined that interference is caused, setting is made such that the reward is decreased, and a process is performed in which at that point of time, the operation is interrupted and restarted from the beginning position, thus making it possible to proceed learning, for example, without causing or maintaining occurrence of a state with a problem.

Subsequently, the value function updating unit 72 has, for example, a value function Q(s, a) that determines the value of an action, and updates the value function depending on the above-described reward by the reward calculation unit 71. The control command (operation locus) is generated based on the updated value function, and outputted to the simulator 52 to perform the above-described process and control the robot 14 (machine). In this manner, it is possible to control the machine by the control command for which the safety of machine learning is ensured (the occurrence of a problem such as damage to the machine, failure of the operation, or damage to the peripheral device is prevented).

Not only the above-described "supervised learning" and "reinforcement learning (Q-learning) but also various techniques such, for example, as the various known machine learning techniques (e.g., "supervised learning", "unsupervised learning", and "reinforcement learning") or "deep learning" that learns extraction of a feature value per se to realize these techniques can be widely applied to the machine learning device according to the present invention. Further, it goes without saying that the application of the machine learning device according to the present invention is not limited to the above-described industrial robot, but the machine learning device may also be applied, for example, to a machine tool, a forging press machine, an injection molding machine, a service robot, or the like, which is controlled by a control apparatus.

In the above, when a manufacturing system is considered which includes a plurality of machine systems including a machine learning device and a machine (robot), for example, it may be configured such that the machine learning device is provided in each of the machine systems, and the plurality of machine learning devices provided in the plurality of machine systems mutually share or exchange data through a communication medium. Further, it is also possible to configure such that the machine learning device exists on a cloud server, for example, through a communication medium such as internet.

According to the machine learning device, machine system, manufacturing system and machine learning method embodying the present invention, it is possible to provide the advantage of being able to ensure the safety of machine learning.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device that learns a control command for a machine by machine learning, comprising:
   a machine learning unit that performs the machine learning to output the control command;
   a simulator that performs a simulation of a work operation of the machine based on the control command; and
   a first determination unit that determines the control command based on an execution result of the simulation by the simulator,
   wherein the first determination unit
      determines that the control command is good and performs inputting of the control command to the machine when there is no problem in the execution result of the simulation, and
      determines that the control command is bad and stops the inputting of the control command to the machine when there is a problem in the execution result of the simulation, and
   wherein when a determination result by the first determination unit is bad,
      the inputting of the control command to the machine is stopped, and
      learning is performed by providing a first result label obtained from the first determination unit to the machine learning unit as training data.

2. The machine learning device according to claim 1, wherein when the determination result by the first determination unit is bad,
   the learning is performed by providing, along with the first result label, a first state quantity including part or whole of calculation result data obtained from the simulator to the machine learning unit.

3. The machine learning device according to claim 1, wherein the machine learning device comprises a neural network.

4. A machine system, comprising
   the machine learning device according to claim 1;
   the machine;
   a control apparatus that controls the machine; and
   a computer apparatus having the machine learning device including the machine learning unit, the simulator, and the first determination unit,
   wherein the computer apparatus and the machine are connected via a network.

5. The machine system according to claim 4, wherein the learning of the machine learning unit is
   performed continuously even during an actual production work by the machine, or
   performed in advance but not performed during the actual production work by the machine.

6. A manufacturing system, comprising a plurality of the machine systems according to claim 4, wherein
   the machine learning device is provided in each of the plurality of the machine systems; and
   a plurality of the machine learning devices provided in the plurality of the machine systems are configured to mutually share or exchange data via a communication medium.

7. The manufacturing system according to claim 6, wherein at least one of the plurality of the machine learning devices exists on a cloud server.

8. A machine learning device that learns a control command for a machine by machine learning, comprising:
   a machine learning unit that performs the machine learning to output the control command;
   a simulator that performs a simulation of a work operation of the machine based on the control command; and
   a first determination unit that determines the control command based on an execution result of the simulation by the simulator,
   wherein the first determination unit determines that the control command is good and performs inputting of the control command to the machine when there is no problem in the execution result of the simulation, and determines that the control command is bad and stops the inputting of the control command to the machine when there is a problem in the execution result of the simulation, wherein the machine learning device further comprises a second determination unit that determines a work result of the machine by the control command, and wherein when a determination result by the first determination unit is good, inputting of the control command to the machine is performed, and learning is performed by providing a second result label obtained from the second determination unit to the machine learning unit as training data.

9. The machine learning device according to claim 8, wherein when the determination result by the first determination unit is good, the learning is performed by providing to the machine learning unit, along with the second result label, a second state quantity including at least one of output data of a sensor that detects a state of the machine or a surrounding environment, internal data of a control software that controls the machine, and calculation data obtained based on the output data of the sensor or the internal data of the control software.

10. A machine learning device that learns a control command for a machine by machine learning, comprising:

a machine learning unit that performs the machine learning to output the control command;

a simulator that performs a simulation of a work operation of the machine based on the control command; and a first determination unit that determines the control command based on an execution result of the simulation by the simulator, wherein the first determination unit determines that the control command is good and performs inputting of the control command to the machine when there is no problem in the execution result of the simulation, and determines that the control command is bad and stops the inputting of the control command to the machine when there is a problem in the execution result of the simulation, and wherein a state of the machine learning unit is preserved as a first state regularly or when a pre-specified condition is satisfied, and the state of the machine learning unit is returned to the first state when a frequency that the determination result by the first determination unit becomes good decreases.

11. A machine learning device that learns a control command for a machine by machine learning, comprising:

a machine learning unit that performs the machine learning to output the control command;

a simulator that performs a simulation of a work operation of the machine based on the control command; and a first determination unit that determines the control command based on an execution result of the simulation by the simulator, wherein the first determination unit determines that the control command is good and performs inputting of the control command to the machine when there is no problem in the execution result of the simulation, and determines that the control command is bad and stops the inputting of the control command to the machine when there is a problem in the execution result of the simulation, and wherein when the determination result by the first determination unit takes three or more states including good and bad, a command speed of the machine included in the control command is changed based on the state.

12. A machine learning device that learns a control command for a machine by machine learning, comprising:

a machine learning unit that performs the machine learning to output the control command;

a simulator that performs a simulation of a work operation of the machine based on the control command; and a first determination unit that determines the control command based on an execution result of the simulation by the simulator, wherein the first determination unit determines that the control command is good and performs inputting of the control command to the machine when there is no problem in the execution result of the simulation, and determines that the control command is bad and stops the inputting of the control command to the machine when there is a problem in the execution result of the simulation, and wherein the machine learning unit comprises:

a reward calculation unit that calculates a reward based on a work state of the machine; and a value function updating unit having a value function that determines a value for the control command and updating the value function based on the reward.

* * * * *